US012652454B2

(12) United States Patent
Joo et al.

(10) Patent No.: US 12,652,454 B2
(45) Date of Patent: Jun. 9, 2026

(54) ELECTRONIC APPARATUS AND METHOD OF CONTROLLING THE SAME

(71) Applicant: SAMSUNG ELECTRONICS CO., LTD., Suwon-si (KR)

(72) Inventors: Sunwoong Joo, Suwon-si (KR); Jongin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 160 days.

(21) Appl. No.: 18/527,534

(22) Filed: Dec. 4, 2023

(65) Prior Publication Data

US 2024/0121501 A1    Apr. 11, 2024

Related U.S. Application Data

(63) Continuation of application No. PCT/KR2022/007496, filed on May 26, 2022.

(30) Foreign Application Priority Data

Jun. 4, 2021    (KR) ........................ 10-2021-0072712

(51) Int. Cl.
H04N 23/611        (2023.01)
G06F 3/16        (2006.01)
(Continued)

(52) U.S. Cl.
CPC ........... H04N 23/611 (2023.01); G06F 3/165 (2013.01); H04N 7/14 (2013.01); H04N 23/631 (2023.01); H04N 23/695 (2023.01)

(58) Field of Classification Search
CPC ...... H04N 23/611; H04N 7/14; H04N 23/631; H04N 23/695; H04N 7/147; H04N 5/64;
(Continued)

(56) References Cited

U.S. PATENT DOCUMENTS

2005/0091311 A1*    4/2005    Lund ................ G08B 13/19656
                                                          348/E7.086
2011/0050840 A1    3/2011    Ryu et al.
                        (Continued)

FOREIGN PATENT DOCUMENTS

CN        102204245 A        9/2011
CN        111294510 A        6/2020
                (Continued)

OTHER PUBLICATIONS

International Search Report dated Sep. 19, 2022 for corresponding application PCT/KR2022/007496.
(Continued)

*Primary Examiner* — Yosef K Laekemariam
(74) *Attorney, Agent, or Firm* — STAAS & HALSEY LLP

(57)        ABSTRACT

An electronic apparatus including: an interface; a display; and a processor configured to: acquire an image captured by a camera while the camera is connected through the interface, obtain information about a position where the camera is placed with respect to the display among a plurality of positions where the camera is placeable with respect to the display, select a motion identification model corresponding to the position where the camera is placed with respect to the display among a plurality of motion identification models prepared based on data corresponding to the plurality of positions, identify a motion of a user from the image captured by the camera based on the selected motion identification model, and perform a function based on the identified motion of the user.

15 Claims, 10 Drawing Sheets

(51) Int. Cl.

| | | |
|---|---|---|
| *H04N 7/14* | (2006.01) |
| *H04N 23/63* | (2023.01) |
| *H04N 23/695* | (2023.01) |

(58) Field of Classification Search
CPC ...... H04N 23/62; H04N 23/64; H04N 23/617;
H04N 5/642; H04N 7/142; H04N 23/57;
H04N 23/61; G06F 3/165; H04M 1/02;
H04M 1/0264
See application file for complete search history.

(56) References Cited

U.S. PATENT DOCUMENTS

| | | | |
|---|---|---|---|
| 2011/0193935 A1* | 8/2011 | Gorzynski | H04N 7/142 |
| | | | 348/E7.083 |
| 2012/0124525 A1 | 5/2012 | Kang | |
| 2014/0368716 A1 | 12/2014 | Maruyama et al. | |
| 2015/0199021 A1 | 7/2015 | Jeon et al. | |
| 2016/0313963 A1 | 10/2016 | Kang et al. | |
| 2020/0204736 A1 | 6/2020 | Byeon et al. | |
| 2020/0326845 A1 | 10/2020 | Lee et al. | |
| 2020/0358963 A1 | 11/2020 | Manzari et al. | |

FOREIGN PATENT DOCUMENTS

| | | | |
|---|---|---|---|
| CN | 213244123 | U | 5/2021 |
| JP | 9-107534 | | 4/1997 |
| JP | 10-150599 | | 6/1998 |
| JP | 2017-138846 | A | 8/2017 |
| JP | 2018-142162 | A | 9/2018 |
| JP | 2020-95645 | A | 6/2020 |
| KR | 10-2011-0025117 | | 3/2011 |
| KR | 10-2012-0051209 | | 5/2012 |
| KR | 10-2015-0084524 | | 7/2015 |
| KR | 10-2016-0125190 | | 10/2016 |
| KR | 10-2017-0114515 | | 10/2017 |
| KR | 10-2020-0077775 | | 7/2020 |
| KR | 10-2020-0130139 | | 11/2020 |
| KR | 20-0492987 | | 1/2021 |
| WO | WO 2013-187100 | A1 | 12/2013 |

OTHER PUBLICATIONS

Written Opinion dated Sep. 19, 2022 for corresponding application.
Korean Office Action issued Nov. 11, 2025 for Application No
10-2021-0072712.

* cited by examiner

FIG. 3

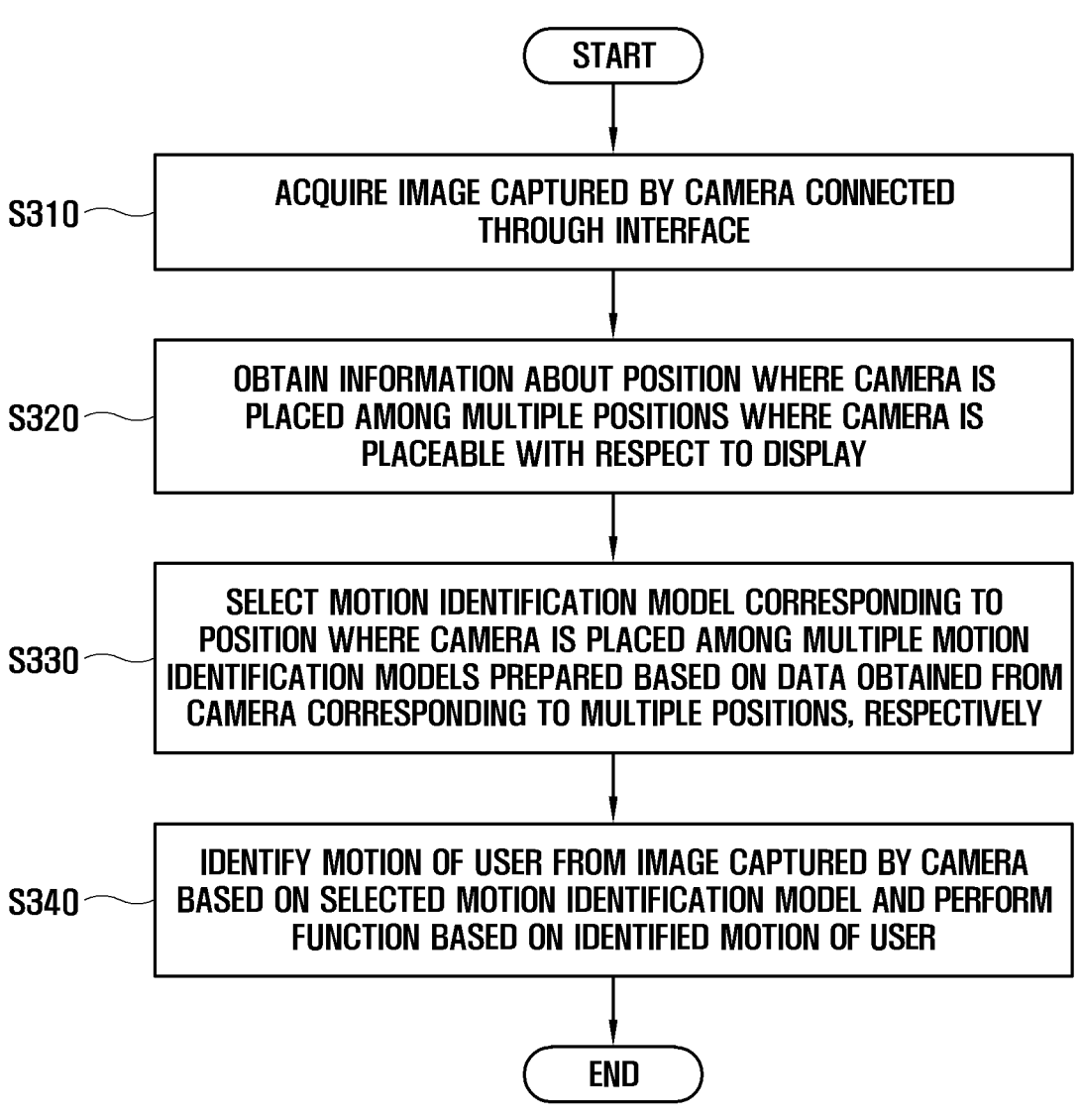

START

S310 — ACQUIRE IMAGE CAPTURED BY CAMERA CONNECTED THROUGH INTERFACE

S320 — OBTAIN INFORMATION ABOUT POSITION WHERE CAMERA IS PLACED AMONG MULTIPLE POSITIONS WHERE CAMERA IS PLACEABLE WITH RESPECT TO DISPLAY

S330 — SELECT MOTION IDENTIFICATION MODEL CORRESPONDING TO POSITION WHERE CAMERA IS PLACED AMONG MULTIPLE MOTION IDENTIFICATION MODELS PREPARED BASED ON DATA OBTAINED FROM CAMERA CORRESPONDING TO MULTIPLE POSITIONS, RESPECTIVELY

S340 — IDENTIFY MOTION OF USER FROM IMAGE CAPTURED BY CAMERA BASED ON SELECTED MOTION IDENTIFICATION MODEL AND PERFORM FUNCTION BASED ON IDENTIFIED MOTION OF USER

END

PLEASE SELECT THE POSITION WHERE
THE CAMERA IS PLACED.

ELECTRONIC APPARATUS AND METHOD OF CONTROLLING THE SAME

CROSS-REFERENCE TO RELATED APPLICATION

This application is a continuation application, under 35 U.S.C. § 111(a), of international application No. PCT/KR2022/007496, filed on May 26, 2022, which claims priority under 35 U.S.C. § 119 to Korean Patent Application No. 10-2021-0072712 filed on Jun. 4, 2021 in the Intellectual Property Office, the disclosures of which are incorporated by reference herein in their entirety.

BACKGROUND

Field

The disclosure relates to an electronic apparatus, which provides various services based on a camera, and a method of controlling the same.

Description of the Related Art

A camera may be placed and used at various positions as it is used in various ways, such as not only for simply capturing an image but also for making a video call or providing services based on movement recognized through the captured images. The camera may be attached to a display of an electronic apparatus or mounted to an external housing of the electronic apparatus, and may be placed in any position that can be changed according to a user's convenience, a surrounding environment, etc. Therefore, a relative position between the display and the camera may not be fixed. In particular, a display in a TV or the like electronic apparatus tends to become larger, and thus deviation in the position of the camera may increase.

In this case, for example, in a video call application, when a relative position is not proper between the camera and a window displaying the other party's image within the display while the other party's image is displayed on the display, it may be inconvenient for a video call user because the image is displayed as if a gaze is directed elsewhere.

As another example, in an application required to recognize detailed movements and motions like an exercise coaching application, a recognition rate for a camera image may be varied depending on the positions of the camera. The recognition of user movements may be implemented using an artificial neural network, and the recognition rate is affected by a dataset used in training the neural network. The neural network trained with the dataset assuming that the camera is positioned at the top of the TV may have a low recognition rate when the camera is positioned at the bottom of the TV.

SUMMARY

According to an embodiment of the disclosure, an electronic apparatus includes: an interface; a display; and a processor configured to: acquire an image captured by a camera while the camera is connected through the interface, obtain information about a position where the camera is placed with respect to the display among a plurality of positions where the camera is placeable with respect to the display, select a motion identification model corresponding to the position where the camera is placed with respect to the display among a plurality of motion identification models prepared based on data corresponding to the plurality of positions, identify a motion of a user from the image captured by the camera based on the selected motion identification model, and perform a function based on the identified motion of the user.

The electronic apparatus may further include a user input, wherein the processor is configured to: display a graphic user interface (GUI), which shows the plurality of positions where the camera is placeable, on the display, and receive a user's input of selecting the position where the camera is placed, through the GUI.

The processor may be configured to display a notification to guide a user to change the position of the camera on the display based on no motion identification model being prepared corresponding to the position where the camera is placed among the plurality of motion identification models.

The image captured by the camera may include a first image, and the processor may be configured to: select a motion identification model prepared based on a second image captured at a position within a predetermined range of the position of the camera among the plurality of motion identification models, acquire a third image by correcting the first image to correspond to the second image, and identify the motion of the user from the third image based on the selected motion identification model.

The image captured by the camera may include a first image, and the processor may be configured to: select a motion identification model prepared based on a second image captured at an image capturing angle within a predetermined range of an image capturing angle of the camera among the plurality of motion identification models, acquire a third image by correcting the first image to correspond to the second image, and identify the motion of the user from the third image based on the selected motion identification model.

The processor may be configured to: identify content captured at a position corresponding to the position where the camera is placed among a plurality of pieces of content captured at different positions, and display the identified content on the display.

The processor may be configured to: identify content captured at an image capturing angle corresponding to an image capturing angle of the camera among a plurality of pieces of content captured at different image capturing angles, and display the identified content on the display.

The processor may be configured to display the identified content and the image captured by the camera together on the display.

The processor may be configured to: identify a certain area of the display to display a GUI related to a video call based on the obtained information, and display the GUI on the certain area.

The GUI may include at least one of a video call window, a video call window animation, a video call receiving/sending notification, and a video call receiving/sending notification animation.

The electronic apparatus may further include a loudspeaker configured to output a sound related to a video call in a plurality of output directions, wherein the processor is configured to control the loudspeaker to output the sound in a direction close to a certain area among the plurality of output directions.

According to an embodiment of the disclosure, a method of controlling an electronic apparatus includes: acquiring an image captured by a camera while the camera is connected through an interface; obtaining information about a position where the camera is placed with respect to the display among a plurality of positions where the camera is placeable with respect to a display; selecting a motion identification model corresponding to the position where the camera is placed with respect to the display among a plurality of motion identification models prepared based on data corresponding to the plurality of positions; identifying a motion of a user from the image captured by the camera based on the selected motion identification model; and performing a function based on the identified motion of the user.

The obtaining information about the position where the camera is placed may include: displaying a GUI, which shows the plurality of positions where the camera is placeable, on the display; and receiving a user's input of selecting the position where the camera is placed, through the GUI.

The method may further include displaying a notification to guide a user to change the position of the camera on the display based on no motion identification model being prepared corresponding to the position where the camera is placed among the plurality of motion identification models.

The image captured by the camera may include a first image, and the selecting the motion identification model may include: selecting a motion identification model prepared based on a second image captured at a position within a predetermined range of the position of the camera among the plurality of motion identification models, acquiring a third image by correcting the first image to correspond to the second image, and identifying the motion of the user from the third image based on the selected motion identification model.

The image captured by the camera may include a first image, and the selecting the motion identification model may include: selecting a motion identification model prepared based on a second image captured at an image capturing angle within a predetermined range of an image capturing angle of the camera among the plurality of motion identification models, acquiring a third image by correcting the first image to correspond to the second image, and identifying the motion of the user from the third image based on the selected motion identification model.

The method may further include: identifying content captured at a position corresponding to the position where the camera is placed among a plurality of pieces of content captured at different positions; and displaying the identified content on the display.

The method may further include: identifying content captured at an image capturing angle corresponding to an image capturing angle of the camera among a plurality of pieces of content captured at different image capturing angles, and displaying the identified content on the display.

The displaying on the display may include displaying the identified content and the image captured by the camera together on the display.

The method may further include identifying a certain area of the display to display a GUI related to a video call based on the obtained information, and displaying the GUI on the certain area.

The method may further include: outputting a sound related to a video call in a direction close to a certain area among a plurality of output directions through a loudspeaker having a plurality of output directions.

BRIEF DESCRIPTION OF THE DRAWINGS

The foregoing and other aspects, features and advantages according to embodiments of the disclosure will become more apparent from the following description, taken in conjunction with the accompanying drawings.

FIG. 3 is a flowchart showing operations of an electronic apparatus according to an embodiment of the disclosure.

DETAILED DESCRIPTION OF EMBODIMENTS

Figure 1:
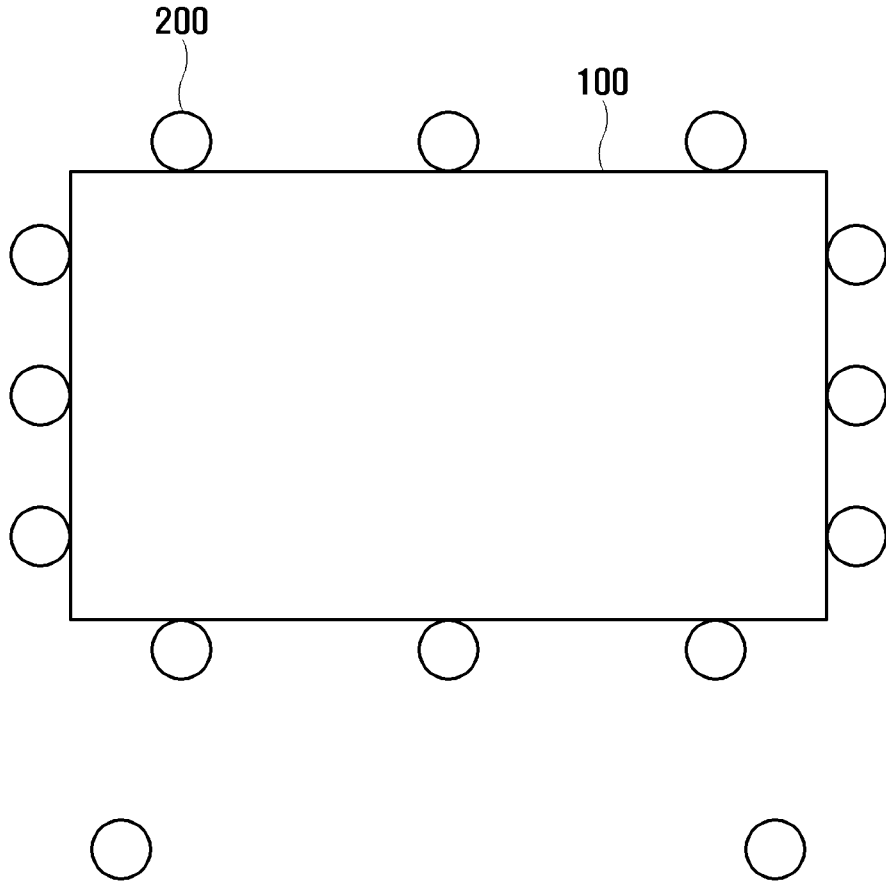
FIG. 1 is a diagram showing an electronic apparatus and cameras placed at various positions according to an embodiment of the disclosure.

Below, exemplary embodiments will be described in detail with reference to accompanying drawings. In the drawings, like numerals or symbols refer to like elements having substantially the same function, and the size of each element may be exaggerated for clarity and convenience of description. However, the configurations and functions illustrated in the following exemplary embodiments are not construed as limiting the present inventive concept and the key configurations and functions. In the following descriptions, details about publicly known functions or features will be omitted if it is identified that they cloud the gist of the present inventive concept.

In the following exemplary embodiments, terms 'first', 'second', etc. are only used to distinguish one element from another, and singular forms are intended to include plural forms unless otherwise mentioned contextually. In the following exemplary embodiments, it will be understood that terms 'comprise', 'include', 'have', etc. do not preclude the presence or addition of one or more other features, numbers, steps, operation, elements, components or combination thereof. In addition, a 'module' or a 'portion' may perform at least one function or operation, be achieved by hardware, software or combination of hardware and software, and be integrated into at least one module. In the disclosure, at least one among a plurality of elements refers to not only all the plurality of elements but also both each one of the plurality of elements excluding the other elements and a combination thereof.

An aspect of the disclosure is to provide an electronic apparatus, which provides better services based on a camera, and a method of controlling the same.

According to an embodiment of the disclosure, a user interface displayed on a display is varied depending on a position of a camera, thereby decreasing inconvenience caused by a relative position between the display and the camera.

Further, a recognition rate for a camera image is increased using data based on a position of a camera.

FIG. 1 is a diagram showing an electronic apparatus and cameras placed at various positions.

According to an embodiment of the disclosure, an electronic apparatus 100 may be implemented as a display apparatus including a display 121. For example, the electronic apparatus 100 may include a TV, a computer, a smartphone, a tablet computer, a portable media player, a wearable device, a video wall, an electronic picture frame, etc. However, the disclosure is not limited to the implementation example of the electronic apparatus 100. Alternatively, the electronic apparatus 100 may be implemented as an image processing apparatus such as a set-top box that transmits a signal to an external display connected by a wire or wirelessly.

According to an embodiment of the disclosure, a camera 200 may be placed at various positions as shown in FIG. 1. For example, the camera 200 may be detachably mounted to an external housing of the electronic apparatus 100. In this case, the mountable places shown in FIG. 1 includes the top (left, middle and right positions), bottom (left, middle and right positions), right (upper, middle and lower positions), and left (upper, middle and lower positions) of the electronic apparatus 100. Below, the descriptions will be made using these terms when FIG. 1 is referred to in FIGS. 3 to 10. However, this is merely an example, and the positions where the camera is placed is not limited to those shown in the accompanying drawings.

Further, the camera 200 may be placed at a position spaced apart by a predetermined distance from the electronic apparatus 100, such as a storage cabinet placed under the electronic apparatus 100. In this way, the position of the camera 200 may be varied depending on the surrounding environments.

When the camera 200 is changed in position, an image captured by the camera 200 is changed. Therefore, according to the disclosure, there are provided an electronic apparatus, which prevents user inconvenience or functional deterioration while providing services, and a method of controlling the same.

Below, the configurations of the electronic apparatus according to an embodiment of the disclosure will be described with reference to the accompanying drawings.

Figure 2:
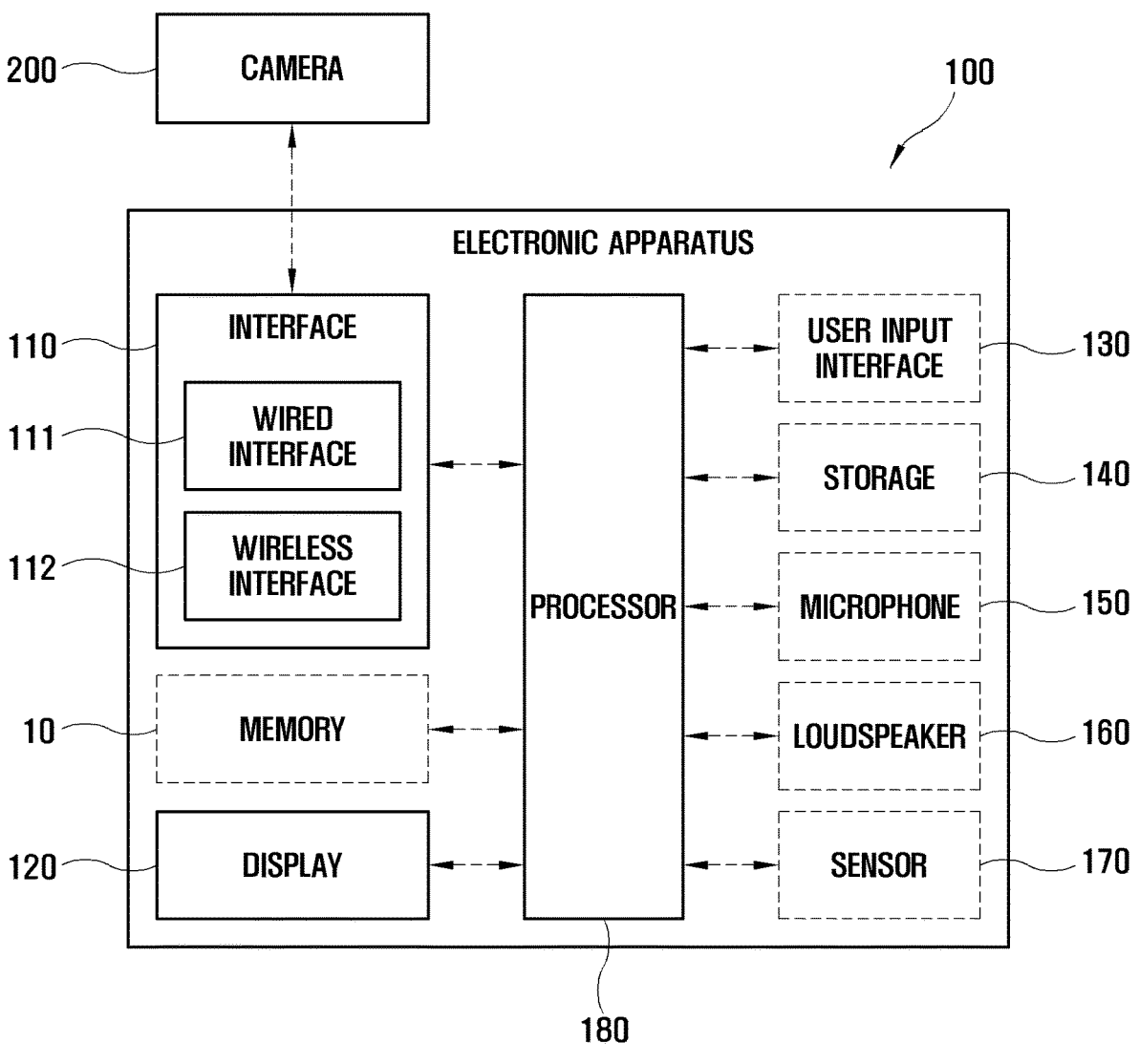
FIG. 2 is a block diagram showing the configuration of an electronic apparatus according to an embodiment of the disclosure.

FIG. 2 is a block diagram of an electronic apparatus according to an embodiment of the disclosure.

As shown in FIG. 2, the electronic apparatus 100 may include an interface 110.

The interface 110 may include a wired interface 111. The wired interface 111 may include a connector or port to which an antenna capable of receiving a broadcast signal based on broadcast standards such as terrestrial/satellite broadcasts is connectable, or a cable capable of receiving a broadcast signal based on cable broadcast standards is connectable. Alternatively, the electronic apparatus 100 may include a built-in antenna capable of receiving a broadcast signal. The wired interface 111 may include a connector, port, etc., based on video and/or audio transmission standards, such as a high-definition multimedia interface (HDMI) port, a DisplayPort, a DVI port, Thunderbolt, composite video, component video, super video, and syndicat des constructeurs d'appareils radiorecepteurs et televiseurs (SCART). The wired interface 111 may include a connector or port based on universal data transmission standards, such as a universal serial bus (USB) port. The wired interface 111 may include a connector or port to which an optical cable based on optical transmission standards is connectable. The wired interface 111 may include a connector or port to which an external microphone or an external audio device with a microphone is connected for the reception or input of an audio signal from the audio device. The wired interface 111 may include a connector or port to which a headset, an earphone, an external loudspeaker and the like audio device is connected for the transmission or output of an audio signal to the audio device. The wired interface 111 may include a connector or port based on network transmission standards such as Ethernet. For example, the wired interface 111 may be implemented as a local area network (LAN) card connected to a router or a gateway by a wire.

The wired interface 111 is connected to a set-top box, an optical media reproducing device or the like external device, an external display apparatus, a loudspeaker, a server, etc. through the connector or port by 1:1 or 1:N (where, N is a natural number), thereby receiving a video/audio signal from the external device or transmitting a video/audio signal to the external device. The wired interface 111 may include connectors or ports for individually transmitting video/audio signals.

Further, according to an embodiment, the wired interface 111 may be internally provided in the electronic apparatus 100, or may be implemented as a dongle or a module and detachably connected to the connector of the electronic apparatus 100.

The interface 110 may include a wireless interface 112. The wireless interface 112 may be variously implemented corresponding to the implementation of the electronic apparatus 100. For example, the wireless interface 112 may employ wireless communication methods such as radio frequency, Zigbee, Bluetooth, Wi-Fi, ultrawideband (UWB), near field communication (NFC), etc. The wireless interface 112 may be implemented by a wireless communication module that performs wireless communication with an access point (AP) through Wi-Fi, a wireless communication module that performs one-to-one direct wireless communication such as Bluetooth, etc. The wireless interface 112 may perform wireless communication with a server on a network, thereby exchanging a data packet with a server. The wireless interface 112 may further include an infrared (IR) transmitter and/or an IR receiver to transmit and/or receive an IR signal according to IR communication standards. The wireless interface 112 may receive or input a remote-control signal from a remote controller or other external devices through the IR transmitter and/or IR receiver, or may transmit or output the remote-control signal to other external devices. As an alternative example, the electronic apparatus 100 may transmit and receive a remote-control signal to and from the remote controller or other external devices through the wireless interface 112 based on other standards such as Wi-Fi and Bluetooth.

When a video/audio signal received through the interface 110 is a broadcast signal, the electronic apparatus 100 may further include a tuner to be tuned to channels for the received broadcast signal.

When the electronic apparatus 100 is implemented by a display apparatus, the electronic apparatus 100 may include a display 120. The display 120 includes a display panel capable of displaying an image on a screen thereof. The display panel may have a light receiving structure like a liquid crystal display (LCD) type, or a self-emissive structure like an organic light emitting diode (OLED) type. The display 120 may include an additional element according to the structures of the display panel. For example, when the display panel is of the LCD type, the display 120 includes an LCD panel, a backlight unit for illuminating the LCD panel, and a panel driving substrate for driving liquid crystal of the LCD panel. Hereinafter, a part of the screen where an image is displayed will be referred to as a display 121.

The electronic apparatus 100 may include a user input interface 130.

The user input interface 130 transmits various preset control instructions or unrestricted information to the main processor 180 in response to a user input. The user input interface 130 may include various input means for receiving a user's input.

According to an embodiment, the user input interface 130 may include a keypad (or an input panel) including a power key, a numeral key, a menu key or the like buttons provided in the electronic apparatus 100.

According to an embodiment, the user input interface 130 includes an input device that generates an instruction/data/information/signal previously set to remotely control the electronic apparatus 10 and transmits it to the electronic apparatus 100. The input device may for example include a remote controller, a game console, a keyboard, a mouse, etc. and receive a user input as separated from the electronic apparatus 100.

The remote controller may include at least one button for receiving a user's input. According to an embodiment, the remote controller may include a touch sensor for receiving a user's touch input (touch gesture) and/or a motion sensor for detecting the remote controller's own motion caused by a user. According to an embodiment, the input device includes a terminal such as a smartphone in which a remote-control application is installed. In this case, the input device can receive a user's touch input through the touch screen.

The input device is used as an external apparatus that performs wireless communication with the main body of the electronic apparatus 100, in which the wireless communication is based on Bluetooth, IrDA, RF communication, WLAN, or Wi-Fi direct.

According to an embodiment, the user input interface 130 may include a motion detector that detects a user's hand motion, i.e., a hand gesture (hereinafter referred to as a 'gesture'). The motion detector of the electronic apparatus 100 may output data by detecting the moving distance, the moving speed, the area of a moving region, etc. of a hand.

According to an embodiment, the user input interface 130 may include a touch detector that detects a user's touch on a bezel area surrounding the display 121.

According to an embodiment, the user input interface 130 may include a microphone 150 or the like sound receiver 130 that receives speech uttered by a user.

According to an embodiment, the user input interface 130 may receive a user's input for setting a distance as a basis of privacy processing for image data. For example, the user input interface 130 may receive a user's input for setting or adjusting (changing) a set distance or a reference position corresponding to the set distance.

The electronic apparatus 100 may include a storage 140. The storage 140 is configured to store digitalized data. The storage 140 includes a nonvolatile storage which retains data regardless of whether power is on or off, and a volatile memory to which data to be processed by the processor 180 is loaded and which retains data only when power is on. The storage includes a flash-memory, a hard-disc drive (HDD), a solid-state drive (SSD) a read only memory (ROM), etc. and the memory includes a buffer, a random-access memory (RAM), etc.

The electronic apparatus 100 may include the microphone 150. The microphone 150 collects a sound of an external environment such as a user's speech. The microphone 150 transmits a signal of the collected sound to the processor 180. The electronic apparatus 100 may include the microphone 150 to collect a user's speech, or receive a speech signal from an external apparatus such as a smartphone, a remote controller with a microphone, etc. through the interface 110. The external apparatus may be installed with a remote-control application to control the electronic apparatus 100 or implement a function of speech recognition, etc. The external apparatus with such an installed application can receive a user's speech, and perform data transmission/reception and control through Wi-Fi/BT or infrared communication with the electronic apparatus 100, and thus a plurality of interface units 110 for the communication may be present in the electronic apparatus 100.

The electronic apparatus 100 may include a loudspeaker 160. The loudspeaker 160 outputs a sound based on audio data processed by the processor 180. The loudspeaker 160 includes a unit loudspeaker provided corresponding to audio data of a certain audio channel, and may include a plurality of unit loudspeakers respectively corresponding to audio data of a plurality of audio channels. Alternatively, the loudspeaker 160 may be provided separately from the electronic apparatus 100, and in this case the electronic apparatus 100 may transmit audio data to the loudspeaker 160 through the interface 110.

The electronic apparatus 100 may include a sensor 170. The sensor 170 may detect the state of the electronic apparatus 100 or the surrounding states of the electronic apparatus 100, and transmit the detected information to the processor 180. The sensor 170 includes a camera.

Besides, the sensor 170 may include, but not limited to, at least one of a magnetic sensor, an acceleration sensor, a temperature/moisture sensor, an infrared sensor, a gyroscope sensor a positioning sensor (e.g., a global positioning system (GPS)), a barometer, a proximity sensor, and a red/green/blue (RGB) sensor (e.g., an illuminance sensor). It will be possible for those skilled in the art to intuitively deduce the functions of the sensors from their names, and thus detailed descriptions thereof will be omitted.

The electronic apparatus 100 may include the processor 180. The processor 180 may include one or more hardware processors implemented by a CPU, a chipset, a buffer, a circuit, etc. mounted onto a printed circuit board, and may also be designed as a system on chip (SOC). The processor 180 includes modules corresponding to various processes, such as a demultiplexer, a decoder, a scaler, an audio digital signal processor (DSP), an amplifier, etc. when the electronic apparatus 100 is implemented by a display apparatus. Here, some or all of the modules may be implemented as the SOC. For example, the demultiplexer, the decoder, the scaler, and the like modules related to video processing may be implemented as a video processing SOC, and the audio DSP may be implemented as a chipset separated from the SOC.

When a speech signal of a user's speech is obtained through the microphone 150 or the like, the processor 180 may convert the speech signal into speech data. In this case, the speech data may be text data obtained through a speech-to-text (STT) processing process of converting a speech signal into the text data. The processor 180 identifies a command indicated by the speech data, and performs an operation based on the identified command. Both the process of the speech data and the process of identifying and carrying out the command may be performed in the electronic apparatus 100. However, in this case, system load needed for the electronic apparatus 100 and required storage capacity are relatively increased, and therefore at least a part of the process may be performed by at least one server connected for communication with the electronic apparatus 100 through a network.

The processor 180 according to the disclosure may call and execute at least one instruction among instructions for software stored in a storage medium readable by the electronic apparatus 100 or the like machine. This enables the electronic apparatus 100 and the like machine to perform at least one function based on the at least one called instruction. The one or more instructions may include a code created by a compiler or a code executable by an interpreter. The machine-readable storage medium may be provided in the form of a non-transitory storage medium. Here, the 'non-transitory' merely means that the storage medium is tangible and does not include a signal (for example, an electromagnetic wave), and this term does not distinguish between cases where data is semi-permanently and temporarily stored in the storage medium.

Meanwhile, the processor 180 may perform at least a part of data analysis, processing, and result information generation through at least one of machine learning, a neural network, or a deep learning algorithm as a rule-based or AI algorithm to acquire an image captured by the camera connected through the interface, obtain information about a position where the camera is placed among a plurality of positions where the camera is placeable, select an operation identifying model corresponding to the obtained information among a plurality of operation identifying models established based on data obtained from the camera corresponding to the plurality of positions, identify a user's operation from the image captured by the camera based on the selected operation identifying model, and perform a function based on the identified user's operation.

The processor 180 may obtain information about a position where the camera is placed among a plurality of positions where the camera is placeable, and convert data obtained from the camera corresponding to the plurality of positions into a form suitable to be used as an input for an artificial intelligence (AI) model. The AI model may be created through learning. When the AI model is created through the learning, it means that a basic AI model is trained by a learning algorithm using a large number of training data to create a predefined operation rule or AI model set to perform a desired characteristic (or purpose). The AI model may include a plurality of neural network layers. Each of the plurality of neural network layers has a plurality of weight values, and performs neural network calculation through calculation between a calculation result of a previous layer and the plurality of weight values.

The inference/prediction refers to technology of identifying information and logically making infer and predict the information, and includes knowledge/possibility-based deduction, optimization prediction, preference-based planning, recommendation, etc.

For example, the processor 180 may function as a learner and a recognizer. For instance, the learner may perform a function of generating the trained neural network, and the recognizer may perform a function of recognizing (or inferring, predicting, estimating and identifying) the data based on the trained neural network. The learner may generate or update the neural network. The learner may obtain learning data to generate the neural network. For example, the learner may obtain the learning data from the storage 140 or from the outside. The learning data may be data used for training the neural network, and the data subjected to the foregoing operations may be used as the learning data to train the neural network.

Before training the neural network based on the learning data, the learner may perform a preprocessing operation with regard to the obtained learning data or select data to be used in learning among a plurality of pieces of the learning data. For example, the learner may process the learning data to have a preset format, apply filtering to the learning data, or process the learning data to be suitable for the learning by adding/removing noise to/from the learning data. The learner may use the preprocessed learning data to generate the neural network which is set to perform the foregoing operations.

The trained neural network may include a plurality of neural networks (or layers). The nodes of the plurality of neural networks have weight values, and the plurality of neural networks may be connected to one another so that an output value of a certain neural network can be used as an input value of another neural network. As an example of the neural network, there are a convolutional neural network (CNN), a deep neural network (DNN), a recurrent neural network (RNN), a restricted Boltzmann machine (RBM), a deep belief network (DBN), a bidirectional recurrent deep neural network (BRDNN) and deep Q-networks.

Meanwhile, the recognizer may obtain target data to carry out the foregoing operations. The target data may be obtained from the storage 140 or from the outside. The target data may be data targeted to be recognized by the neural network. Before applying the target data to the learned neural network, the recognizer may perform a preprocessing operation with respect to the obtained target data, or select data to be used in recognition among a plurality of pieces of target data. For example, the recognizer may process the target data to have a preset format, apply filtering to the target data, or process the target data into data suitable for recognition by adding/removing noise. The recognizer may obtain an output value output from the neural network by applying the preprocessed target data to the neural network. Further, the recognizer may obtain a stochastic value or a reliability value together with the output value.

For example, the method of controlling the electronic apparatus 100 according to the disclosure may be provided as involved in a computer program product. The computer program product may include instructions of software to be executed by the processor 180 as described above. The computer program product may be traded as a commodity between a seller and a buyer. The computer program product may be distributed in the form of a machine-readable storage medium (for example, a compact disc read only memory (CD-ROM)) or may be directly or online distributed (for example, downloaded or uploaded) between two user apparatuses (for example, smartphones) through an application store (for example, Play Store™). In the case of the online distribution, at least a part of the computer program product may be transitorily stored or temporarily produced in a machine-readable storage medium such as a memory of a manufacturer server, an application-store server, or a relay server.

FIG. 3 is a flowchart showing operations of an electronic apparatus according to an embodiment of the disclosure.

According to an embodiment of the disclosure, the processor 180 may acquire an image captured by the camera 200 connected through the interface 110 (S310). As described above with reference to FIG. 2, the camera 200 may be connected to the electronic apparatus 100 through the interface 110 including the wired interface 111 and the wireless interface 112, but there are no limits to the connection type.

According to an embodiment of the disclosure, the processor 180 may obtain information about a position where the camera 200 is placed among a plurality of positions where the camera 200 is placeable with respect to the display (S320). The camera 200 may be placed at various positions as shown in FIG. 1, but may be set or changed according to a user's convenience without being limited to that shown in FIG. 1.

According to an embodiment of the disclosure, the information about the position where the camera 200 is placed includes information about a relative position between the camera 200 and the display 121 of the electronic apparatus 100 in addition to the information about the position of the camera 200. The processor 180 may use various methods to obtain the information about the position where the camera 200 is placed.

For example, gaze tracking may be used to leave a predetermined mark at a specific position of the display 121 and guide a user to gaze at the mark, thereby identifying the relative position between the display 121 and the camera 200.

For another example, received signal strength indication (RSSI) and trilateration may be used. The electronic apparatus 100 may receive a wireless signal from the camera 200 through the interface 110, and the processor 180 may measure the RSSI between the camera 200 and the electronic apparatus 100 based on the received wireless signal and identify the position of the camera 200 based on the trilateration. In this case, it is possible to identify a two-dimensional position of the camera 200 on a virtual plane parallel to the surface of the display 121.

For still another example, as a method of using hardware to identify the position, a sensor 170 may be provided in an external housing of the electronic apparatus 100, e.g., an edge area of the display 121, and a position detected by the sensor 170 may be recognized as the position of the camera 200. In this case, to distinguish the camera 200 from other objects which have already been mounted or attached to the electronic apparatus 100, there may be used various methods such that the user interface for guiding a user to place the camera 200 may be displayed on the display 121 and then comparison may be performed based on difference between before and after placing the camera 200.

As another method of using hardware to identify the position of the camera 200, multiple camera slots are provided in the display, and a simple sensor such as a contact sensor is used to identify which slot the camera is placed in.

In addition, a method of identifying the position of the camera 200 based on a user's input will be described in detail with reference to FIG. 4.

According to an embodiment of the disclosure, the processor 180 may select a motion identification model corresponding to the position where the camera 200 is placed among a plurality of motion identification models provided based on data obtained corresponding to the plurality of positions (S330).

Figure 7:
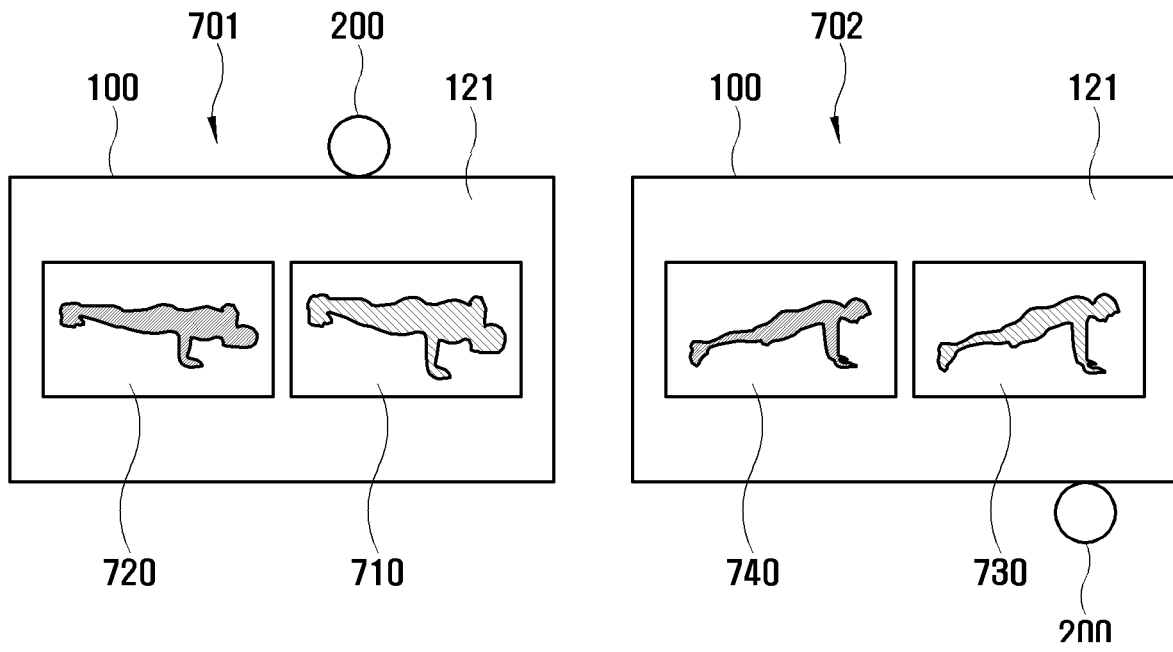
FIG. 7 is a diagram showing an operation of an electronic apparatus according to an embodiment of the disclosure.

As described above, a captured image and a displayed object appearance may be varied depending on the positions of the camera 200. For example, the electronic apparatus 100 shown in FIG. 7 is a TV mounted to a wall at a certain height, and a first image 710 captured by the camera 200 according to a first embodiment 701 of FIG. 7 and a second image 730 captured by the camera 200 according to a second embodiment 702 of FIG. 7 are displayed on the display 121. The first image 710 is an image captured at a slightly oblique angle from a top right position. On the other hand, even though the camera 200 is placed at a bottom right position, the second image 730 captured by the camera 200 is regarded as an image captured at a medium height because the electronic apparatus 100 is mounted to the wall at a certain height. Therefore, a captured person image is displayed as if it is taken from the front.

In this way, images captured by the camera 200 corresponding to the plurality of positions are different from each other.

According to an embodiment of the disclosure, to identify a motion corresponding to an image varied depending on the positions, a plurality of motion identification models is prepared based on data obtained corresponding to the plurality of positions. For example, when the camera is placed at a top left position, a top middle position, a top right position, etc. of the electronic apparatus 100 as shown in FIG. 1, the motion identification models may be prepared based on the data obtained corresponding to the positions. In this case, a plurality of motion identification models may be created according to image taking angles even at one position, and the same motion identification model may be applied to the images acquired from the cameras placed at the positions within a predefined range.

The data obtained corresponding to the plurality of positions includes not only image data obtained for each position, but also data for performing a function of an application, e.g., voice data as necessary. In this case, the image may be not necessarily captured by the camera but based on data obtained by a virtual simulation of when the camera is placed at the corresponding position. Further, the data for performing the function of the application refers to data for performing the function provided by each application through the image captured by the camera 200. For example, in the case of an application that recognizes a user's gesture to perform a function, the data may include reference data to be compared with an image captured by the camera 200 to recognize a specific gesture, image data obtained when one gesture is recognized at multiple positions, data obtained when one gesture is recognized within a predetermined range of a specific position, etc. In addition, that application may use the motion identification model, which is prepared based on data obtained for each specific position, as a resource.

The prepared motion identification model may be used in recognizing an image acquired from the camera placed at the corresponding position. The motion identification model may be an AI model trained by the artificial neural network using such data as input data. When the processor 180 identifies the AI model, the operations may be performed as described with reference to FIG. 2, and, besides, a previously prepared motion identification model and a previously trained AI model may be received from the outside such as a server through the interface.

According to an embodiment of the disclosure, the processor 180 may select the motion identification model corresponding to the position where the camera 200 is placed among the plurality of prepared motion identification models.

In this case, based on the information about the position where the camera 200 is placed, which is obtained in the operation S320, the processor 180 may select the motion identification model prepared corresponding to that position. For example, referring to FIG. 1, the camera 200 may be placed at the left upper position of the electronic apparatus 100, and the motion identification model prepared with data such as an image at an angle corresponding to an image taken from the left upper position may be selected.

In this case, when there is no motion identification model prepared at the position corresponding to the position where the camera 200 is placed among the plurality of motion identification models, the processor 180 may identify a motion identification model prepared based on an image taken at a position within a predetermined range from the position where the camera 200 is placed. For example, it will be assumed that the camera 200 is placed at the left upper position as shown in FIG. 1 but there is no motion identification model prepared corresponding to that left upper position. In this case, when the left upper position and the top left position are within a predetermined range and there is a first motion identification model prepared corresponding to the top left position, the processor 180 may select the first motion identification model.

Alternatively, when there is no motion identification model prepared based on an image taken at a position corresponding to the position where the camera 200 is placed among the plurality of motion identification models, a notification may be displayed to guide the camera 200 to be moved to a position where the motion identification model is prepared, as will be described with reference to FIG. 5, or the motion identification model may be applied by correcting the image captured by the camera 200, as will be described with reference to FIG. 6. Details will be described with reference to FIGS. 5 and 6.

According to an embodiment of the disclosure, the processor 180 may identify a user's motion from the image captured by the camera based on the selected motion identification model, and perform the function based on the identified motion (S340).

For example, when an application that recognizes a gesture to perform a designated function such as a channel change is running, the processor 180 may identify a user's gesture from the image captured by the camera 200 based on the motion identification model identified corresponding to the position where the camera 200 is placed. The processor 180 may perform a function corresponding to the identified gesture, e.g., a channel change.

According to an embodiment of the disclosure, the recognition rate for a camera image may be improved based on the model that reflects the image varied depending on the positions of the camera.

Figure 4:
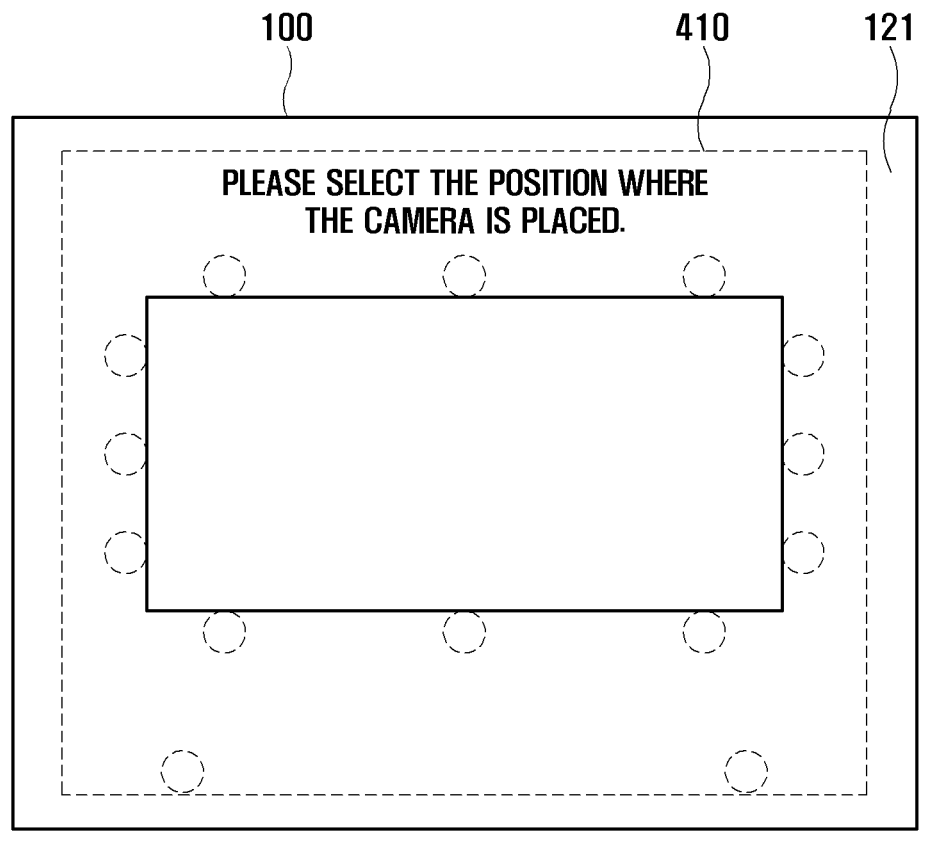
FIG. 4 is a diagram showing an operation of an electronic apparatus according to an embodiment of the disclosure.

FIG. 4 is a diagram showing an operation of an electronic apparatus according to an embodiment of the disclosure.

FIG. 4 shows one of the methods of obtaining the information about the position where the camera 200 is placed among the plurality of positions where the camera 200 is placeable with respect to the display, in connection with the operation S320 of FIG. 3.

The electronic apparatus 100 further includes the user input interface 130. As described in detail with reference to FIG. 2, the user input interface 130 includes a touch panel of the display 121, a button of a remote controller, etc. The processor 180 may display a graphic user interface (GUI) 410 on the display 121 to show the plurality of positions where the camera 200 is placeable. The positions for the camera shown in the GUI 410 may be positions used when the plurality of motion identification models is prepared, as described in the operation S330 of FIG. 3.

The processor 180 may receive a user's input for selecting a position, which is the same or similar to the position where the camera 200 is placed, among the plurality of positions shown in the GUI 410, through the GUI 410. Further, the GUI 410 may include a guide message, such as "please select the position where the camera is placed" to assist a user in recognizing the situation.

However, the GUI 410 is not limited to the foregoing example, and may be displayed in various forms, such as arrows displayed in the form of "↖ ↑ ↗", "↙ ↓ ↘" on the display 121.

According to an embodiment of the disclosure, the position of the camera is more easily identified, and a user's convenience is improved.

Figure 5:
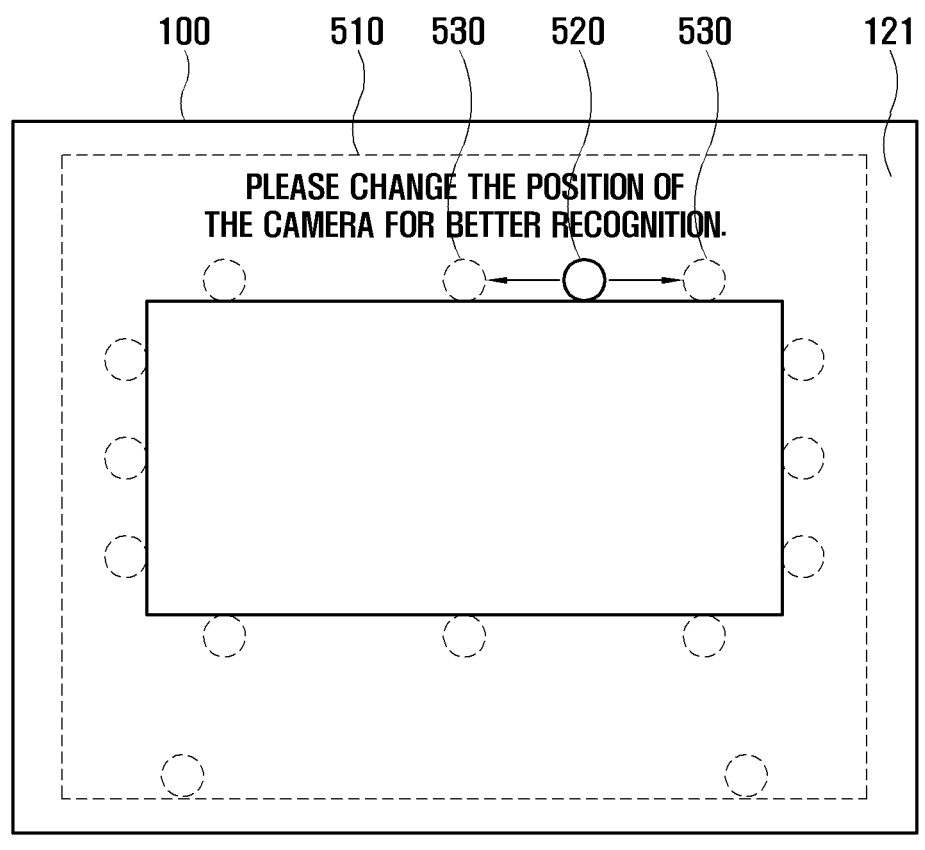
FIG. 5 is a diagram showing an operation of an electronic apparatus according to an embodiment of the disclosure.

FIG. 5 is a diagram showing an operation of an electronic apparatus according to an embodiment of the disclosure.

FIG. 5 shows one among the methods of guiding a user to change the position of the camera, in connection with the operation S330 of FIG. 3.

According to the disclosure, it may be practically difficult to prepare the motion identification models for all the positions where the camera 200 is placeable. Therefore, when there is no motion identification model prepared corresponding to the position where the camera 200 is placed among the plurality of motion identification models, the processor 180 may display a notification 510 on the display 121 to guide a user to change the position of the camera 200. In this case, the notification 510 may include a position 520 for showing where the camera 200 is currently placed, and arrows for guiding a user to move the position of the camera 2200 to positions 530, at which the motion identification models are prepared, around the position 520.

In the notification 510, the plurality of camera positions shown as dotted lines may be displayed on the GUI 410 as the positions used when preparing the plurality of motion identification models, as described in the operation S330 of FIG. 3.

Likewise, to assist a user in recognize the situation, the GUI 410 may include a guide message such as "please change the position of the camera for better recognition."

According to an embodiment of the disclosure, the position of the camera is changed corresponding to the position of the camera based on the previously prepared motion identification model, thereby increasing a motion recognition rate. Further, in this case, it is efficient because the motion recognition rate is increased without cumbersome processes such as preparing a new motion identification model.

Figure 6:
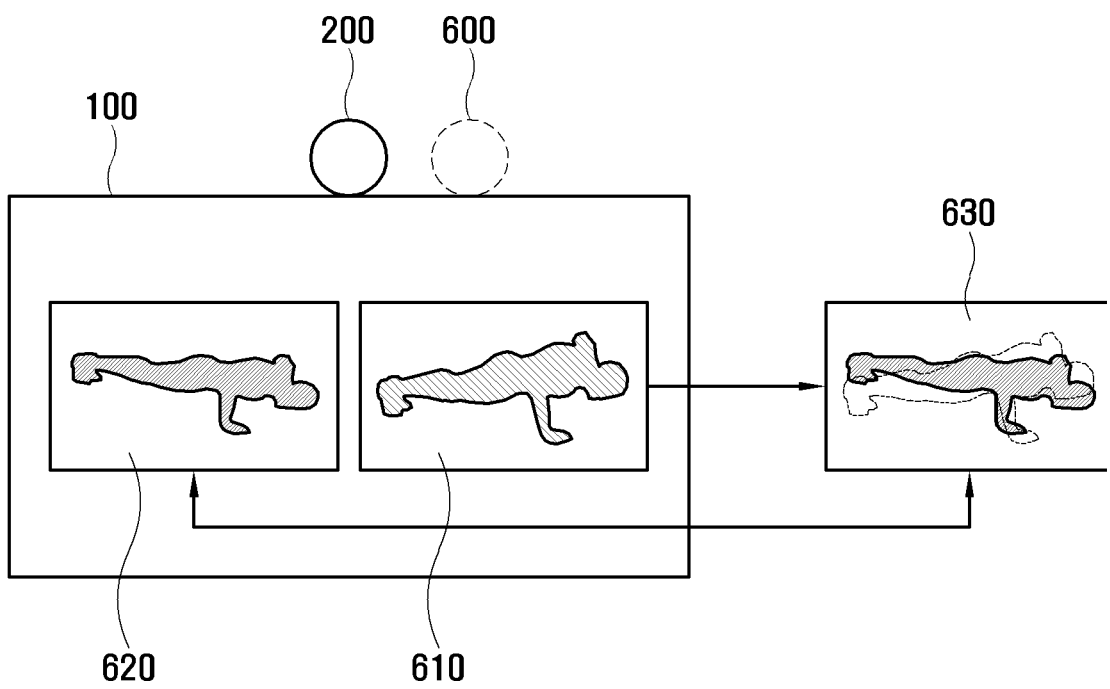
FIG. 6 is a diagram showing an operation of an electronic apparatus according to an embodiment of the disclosure.

FIG. 6 is a diagram showing an operation of an electronic apparatus according to an embodiment of the disclosure.

FIG. 6 shows the operation of the electronic apparatus 100 when a user uses an exercise coaching application. Specifically, in connection with the operation S330 of FIG. 3, it will be illustrated how to correct and apply an image captured by the camera 200 in order to use a previously prepared motion identification model.

Referring to FIG. 6, a first camera 200 connected to the electronic apparatus 100 is positioned at the center of the electronic apparatus 100, and the electronic apparatus 100 is displaying a first image 610 captured by the first camera 200 and a second image 620, i.e., a sample image previously prepared in the exercise coaching application. A user may exercise following exercise motions of a model displayed in the second image 620, and the electronic device 100 may provide services such as counting the number of times and identifying the accuracy with respect to the user's exercise motions.

According to the disclosure, as described above with reference to FIG. 5, it may be practically difficult to prepare the motion identification models for all the positions where the camera 200 is placeable.

First, the processor 180 may select the motion identification model prepared based on the position of the camera 200 and an image taken at a position within a predetermined range among the plurality of motion identification models. Alternatively, the processor 180 may select the motion identification model prepared based on an image capturing angle of the camera 200 and an image captured at an image capturing angle within a predetermined range.

For example, it will be assumed that the motion identification model is prepared based on the second image 620 captured by a second camera 600 positioned close to the first camera 200 among the plurality of motion identification models. When the second camera 600 is placed at a position within a predetermined range of the position of the first camera 200, the processor 180 may select the motion identification model prepared based on the second image captured by the second camera 600. Alternatively, when the image capturing angle of the second image 620 captured by the second camera 600 is within a predetermined range of the image capturing angle of the first camera 200, the processor 180 may select the motion identification model prepared based on the second image 620 captured by the second camera 600.

In addition, the processor 180 may correct the first image 610 captured by the camera 200 to correspond to the second image 620. There may be various correction methods. For example, the depth information of an image may be extracted using the multiple frames of a 2D image, and a 3D image may be generated and corrected based on the extracted depth information. The generated 3D image is then corrected to correspond to the reference data of the motion identification model through a transformation matrix that rotates an object by a specific angle. The processor 180 corrects the first image 610 to correspond to the second image 620, thereby acquiring a third image 630.

The processor 180 may identify a user's motion from the third image 630 corrected based on the selected motion identification model. Therefore, the processor 180 identifies the number of repeated times of exercise or the accuracy of the exercise based on the corrected 3D image 630, thereby increasing the reliability of the identification.

In this case, the display 121 may display the first image 610 for natural image display and user convenience, but may display the third image 630 correct by a user's settings or a manufacturer's settings.

However, in this embodiment, the sample image displayed on the display 121 is not necessarily the same as the second image as data for preparing the motion identification model, and the sample image may be separately generated and displayed to have the same angle as the second image. The sample image may be the same as content to be described later with reference to FIG. 7.

According to an embodiment of the disclosure, the captured image is changed corresponding to the image data on which the previously prepared motion identification model is based, thereby increasing a motion recognition rate. Further, in this case, it is efficient because the motion recognition rate is increased without cumbersome processes such as preparing a new motion identification model.

FIG. 7 is a diagram showing an operation of an electronic apparatus according to an embodiment of the disclosure.

FIG. 7 illustrates that an image captured by the camera 200 and content corresponding to the image captured by the camera 200 among a plurality of pieces of previously prepared content.

The processor 180 may identify content captured at a position corresponding to a position where the camera 200 is placed among a plurality of pieces of content captured at different positions, and display the identified content on the display 121. Alternatively, the processor 180 may identify content captured at an image capturing angle corresponding to an image capturing angle of the camera 200 among the plurality of pieces of content captured at different image capturing angles, and display the identified content on the display 121. In this case, the plurality of pieces of content captured at different positions or angle refers to a plurality of pieces of content acquired by capturing the same content at a plurality of positions or angles where the camera is placeable. For example, when an exercise coaching application is executed, a coaching image corresponding to the same position or angle as that of an image with a user may be displayed as content so that the user can easily follow the exercise motion. The plurality of pieces of content may be previously prepared and stored in the storage 140 or may be received from the outside.

The processor 180 may display the identified content among the plurality of pieces of content, together with the image captured by the camera 200, on the display 121.

Referring to FIG. 7, on the assumption that the electronic apparatus 100 is a TV mounted to a wall at a certain height, a first embodiment 701 of FIG. 7 shows that the camera 200 is placed at a top right position and a second embodiment 702 of FIG. 7 shows that the camera 200 is placed at a bottom right position.

In the first embodiment 701 of FIG. 7, the first image 710 is an image captured by the camera 200 placed at the top right position. The processor 180 may identify first content 720 captured at the position corresponding to the camera 200 among the plurality of pieces of previously prepared content, and display the identified first content 720 on the display 121. Alternatively, the first image 710 captured by the camera 200 according to the first embodiment 701 of FIG. 7 is an image captured at a slightly oblique angle from the top right position. The processor 180 may identify the first content 720 captured at an angle corresponding to an angle at which the first image 710 is captured among the plurality of pieces of previously prepared content, and display the identified first content 720 on the display 121.

In the second embodiment 702 of FIG. 7, the second image 730 is an image captured by the camera 200 placed at the bottom right position. The processor 180 may identify second content 740 captured at the position corresponding to the camera 200 among the plurality of pieces of previously prepared content, and display the identified second content 740 on the display 121. Alternatively, the second image 730 captured by the camera 200 according to the second embodiment 702 of FIG. 7 is an image captured at an angle facing the front from the bottom right position. Although the camera 200 is placed at the bottom right position, the image captured by the camera 200 is regarded as an image captured at a middle height because the electronic apparatus 100 is mounted to the wall at a certain height. Therefore, a captured person image in the second image 730 is shown as if it is taken from the front. The processor 180 may identify the second content 740 captured at an angle corresponding to an angle at which the second image 730 is captured among the plurality of pieces of previously prepared content, and display the identified second content 740 on the display 121.

The processor 180 may identify the content 720 captured at the angle corresponding to the angle at which the first image 710 is captured among the plurality of pieces of previously prepared content, and display the identified content 720 on the display 121.

In this case, based on the information about the position where the camera 200 is placed, which is obtained in the operation S320, the processor 180 may identify the content prepared corresponding to that position. For example, referring to FIG. 1, the camera 200 may be placed at the left upper position of the electronic apparatus 100, and the content at an angle corresponding to an image taken from the left upper position may be identified.

In this case, when there is no content prepared at the position corresponding to the position where the camera 200 is placed among the plurality of pieces of content, the processor 180 may identify content prepared at a position corresponding to a predetermined range of the position where the camera 200 is placed. For example, it will be assumed that the camera 200 is placed at the left upper position as shown in FIG. 1 but there is no content prepared corresponding to that left upper position. In this case, when the left upper position and the top left position are within a predetermined range and there is first content prepared corresponding to the top left position, the processor 180 may identify the first content. This is also applied to an image capturing angle.

Alternatively, when there is no content prepared at a position corresponding to the position where the camera 200 is placed among the plurality of pieces of content, a notification may be displayed to guide the camera 200 to be moved to a position where the content is prepared, as described above with reference to FIG. 5.

According to an embodiment of the disclosure, the plurality of pieces of previously prepared content may be used by a user to use the functions of the application, thereby providing satisfaction and convenience to a user in using the apparatus.

Figure 8:
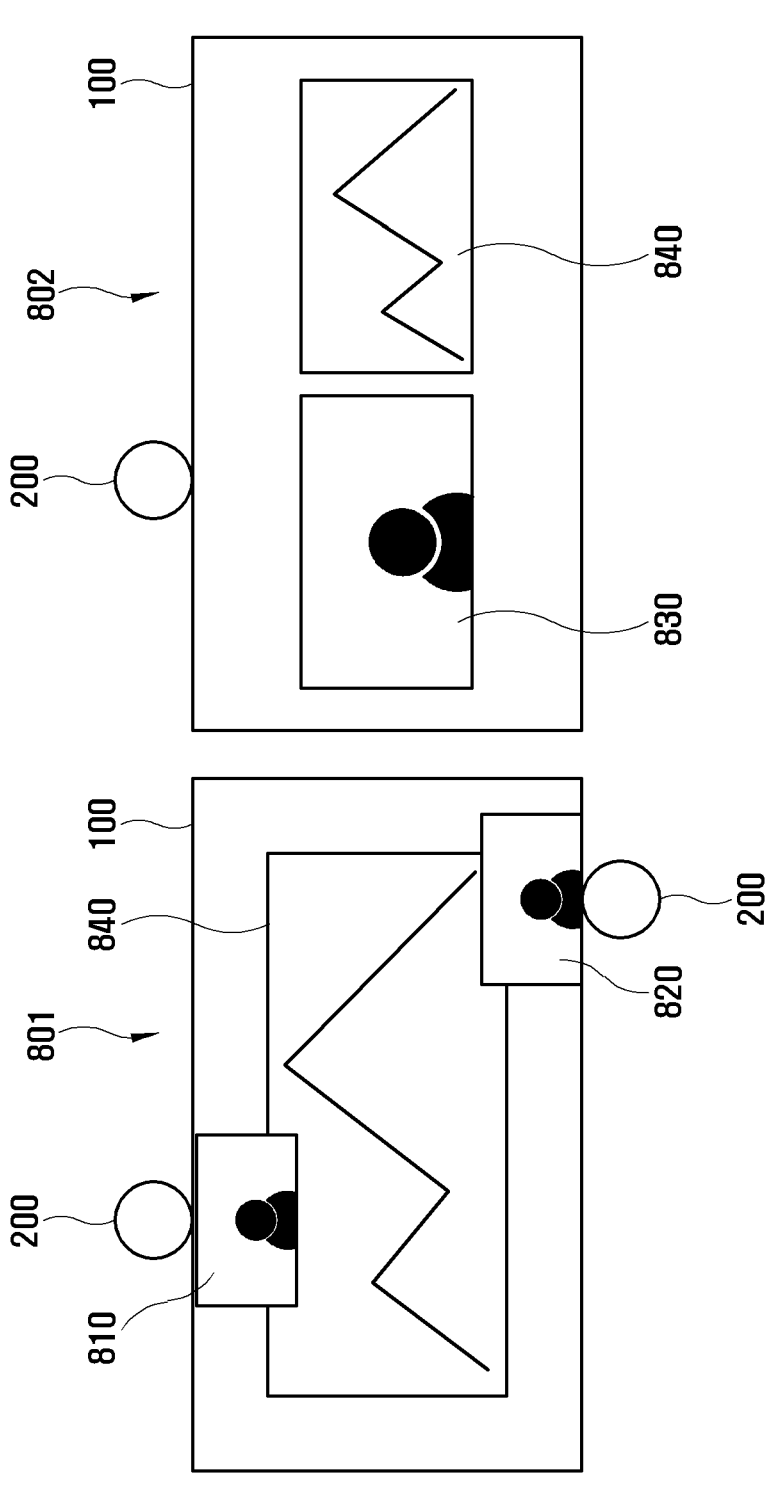
FIG. 8 is a diagram showing an operation of an electronic apparatus according to an embodiment of the disclosure.

FIG. 8 is a diagram showing an operation of an electronic apparatus according to an embodiment of the disclosure.

FIG. 8 illustrates that the GUI is applied differently according to the positions of the camera when a video call application is executed, in connection with the operation S320 of FIG. 3.

When a relative position is not proper between the camera 200 and a window displaying the other party's image while the video call application is running, the gaze of the other party and the gaze of a user of the electronic apparatus 100 are directed to different directions, thereby causing a video call user discomfort.

The processor 180 may obtain the information about the position where the camera 200 is placed among the plurality of positions where the camera is placeable with respect to the display 121. The processor 180 may identify an area of the display 121 to display a GUI related to the video call based on the obtained information. The area may for example be an area where a mismatch between the gaze toward the camera and the gaze toward the other party is minimized. Therefore, the GUI may be displayed on the display in proximity to a position where the camera 200 is identified as being placed. According to an embodiment of the disclosure, the GUI includes a video call window.

For example, in a first embodiment 801 of FIG. 8, the processor 180 may display a video call window 810 of the other party on the display 121 in an area immediately below the camera 200 when the camera 200 is placed at a top position, and may display a video call window 820 of the other party on the display 121 in an area immediately above the camera 200 when the camera 200 is placed at a bottom position. In this case, the processor 180 may display the video call window overlapping with an image 840 that has been being displayed before receiving/sending a video call.

Further, in a second embodiment 802 of FIG. 8, when the display 121 is divided into two areas to display a video call window 830 and a previously displayed image 840 together, the processor 180 may display the video call window 830 in an area closer to the camera 200.

According to an embodiment of the disclosure, discomfort of a gaze mismatch due to a relative position between the display and the camera, which occurs because the user interface displayed on the screen and its operation are different, is reduced.

Figure 9:
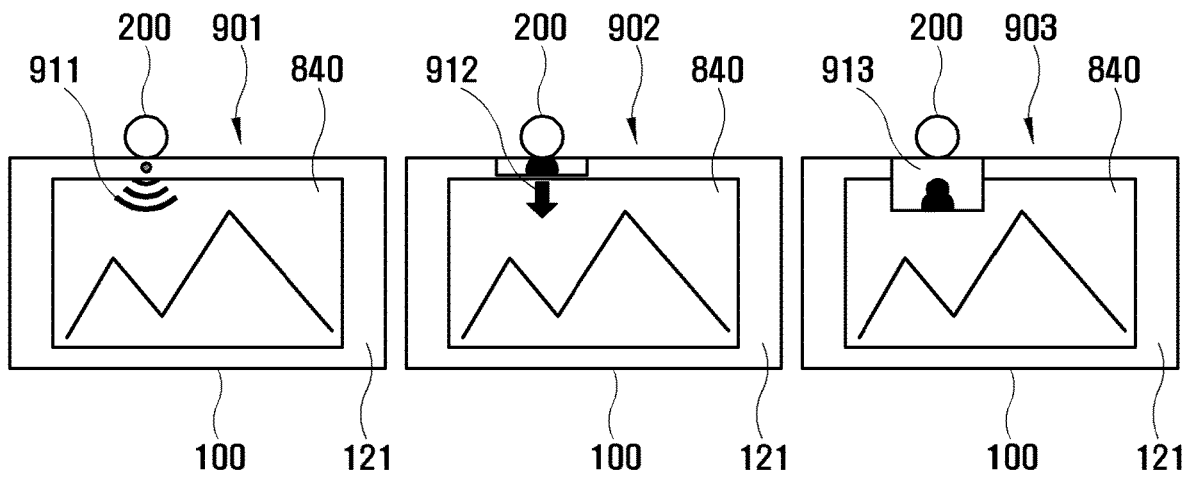
FIG. 9 is a diagram showing an operation of an electronic apparatus according to an embodiment of the disclosure.

FIG. 9 is a diagram showing an operation of an electronic apparatus according to an embodiment of the disclosure.

FIG. 9 illustrates an embodiment devised to provide further convenience to a user in addition to the embodiment of FIG. 8. When a video call is received/made, the processor 180 may identify an area of the display 121 to display a GUI related to the video call based on the position where the camera 200 is placed like that shown in FIG. 8.

According to an embodiment of the disclosure, the GUI may include at least one of a video call window, a video call window animation, a video call receiving/sending notification, and a video call receiving/sending notification animation.

In a first embodiment 901 of FIG. 9, the processor 180 may display a video call receiving/sending notification animation 911 on a certain identified area to guide a user's gaze to be naturally directed toward the camera when receiving or sending a video call. Further, in a second embodiment 902 of FIG. 9, the processor 180 may display a video call window animation 912 that allows the video call window to slide out of or into the certain identified area, thereby a user to easily understand the situation. When the video call window animation 912 fully slides out in the second embodiment 902 of FIG. 9, a video call window 913 may be displayed as shown in a third embodiment 903 of FIG. 9. Even in this case, the processor 180 may display the video call window overlapping with an image 840 that has been being displayed before receiving/sending a video call.

According to an embodiment of the disclosure, various displayed user interfaces and operations provide further convenience to a user.

Figure 10:
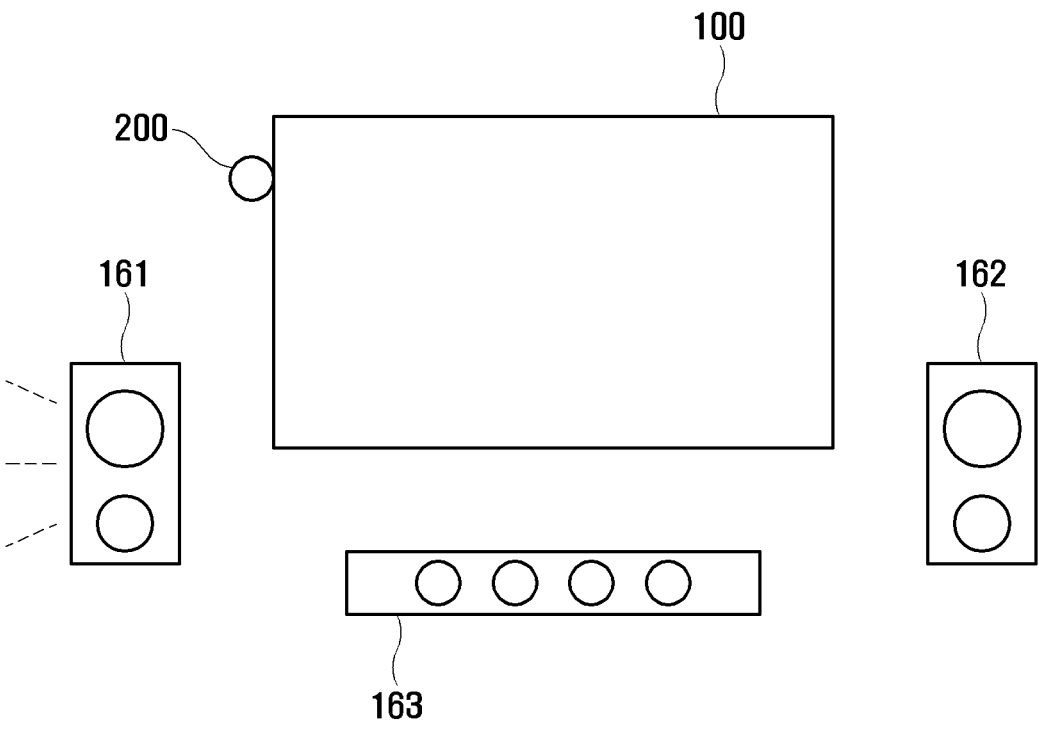
FIG. 10 is a diagram showing an operation of an electronic apparatus according to an embodiment of the disclosure.

FIG. 10 is a diagram showing an operation of an electronic apparatus according to an embodiment of the disclosure.

This embodiment may also be applied not only to an image displayed on the display 121 but also to a sound output according to the positions of the camera.

The electronic apparatus 100 may further include a loudspeaker 160 to output a sound related to a video call in a plurality of output directions. The loudspeaker 160 is the same as that described above in detail with reference to FIG. 2. In this case, the loudspeaker may include not only a built-in loudspeaker 160 of the electronic apparatus, but also an external loudspeaker connected through the interface 110.

The processor 180 may control the loudspeaker to output a sound in a direction close to a certain area among the plurality of output directions.

For example, as shown in FIG. 10, the loudspeakers 161, 162, and 163 may be placed at various positions around the electronic apparatus 100. The processor 180 may obtain information about a position where the camera 200 is placed, and control the loudspeaker 161, which is placed at a position close to the position where the camera is placed, to output a sound among the loudspeakers 160 corresponding to the plurality of output directions based on the obtained information. In this case, the control may be performed in various ways such that the loudspeaker 161 can be controlled to output a sound or an overall sound can be balanced with respect to the loudspeaker 161. As described above with reference to FIGS. 8 and 9, the GUI is displayed at a position identified as having the camera 200 placed, thereby assisting a user in focusing not only a gaze but also hearing on the position where the GUI is displayed.

According to an embodiment of the disclosure, a more complete service is provided to a user by auditory convenience as well as visual convenience.

What is claimed is:

1. An electronic apparatus comprising: an interface; a display; and a processor configured to: acquire an image captured by a camera while the camera is connected through the interface, obtain information about a position where the camera is placed with respect to the display among a plurality of positions where the camera is placeable with respect to the display, select a motion identification model, among a plurality of motion identification models, corresponding to the position where the camera is placed with respect to the display, the plurality of motion identification models being prepared in advance based on data of image taking angles of the camera at the plurality of positions with respect to the display and a function of the electronic apparatus while the camera is placed at the plurality of positions, respectively, identify a motion of a user from the image captured by the camera based on the selected motion identification model, and perform the function based on the identified motion of the user.

2. The electronic apparatus of claim 1, further comprising a user input interface, wherein the processor is configured to: display a graphic user interface (GUI), which shows the plurality of positions where the camera is placeable, on the display, and receive a user's input of selecting the position where the camera is placed, through the GUI.

3. The electronic apparatus of claim 1, wherein the processor is configured to display a notification to guide the user to change the position of the camera on the display based on no motion identification model being prepared corresponding to the position where the camera is placed among the plurality of motion identification models.

4. The electronic apparatus of claim 1, wherein the image captured by the camera comprises a first image, and the processor is configured to: select a motion identification model prepared based on a second image captured at a position within a predetermined range of the position of the camera among the plurality of motion identification models, acquire a third image by correcting the first image to correspond to the second image, and identify the motion of the user from the third image based on the selected motion identification model.

5. The electronic apparatus of claim 1, wherein the image captured by the camera comprises a first image, and the processor is configured to: select a motion identification model prepared based on a second image captured at an image capturing angle within a predetermined range of an image capturing angle of the camera among the plurality of motion identification models, acquire a third image by correcting the first image to correspond to the second image, and identify the motion of the user from the third image based on the selected motion identification model.

6. The electronic apparatus of claim 1, wherein the processor is configured to: identify content captured at a position corresponding to the position where the camera is placed among a plurality of pieces of content captured at different positions, and display the identified content on the display.

7. The electronic apparatus of claim 1, wherein the processor is configured to: identify content captured at an image capturing angle corresponding to an image capturing angle of the camera among a plurality of pieces of content captured at different image capturing angles, and display the identified content on the display.

8. The electronic apparatus of claim 7, wherein the processor is configured to display the identified content and the image captured by the camera together on the display.

9. The electronic apparatus of claim 1, wherein the processor is configured to: identify a certain area of the display to display a GUI related to a video call based on the obtained information, and display the GUI on the certain area.

10. The electronic apparatus of claim 7, further comprising a loudspeaker configured to output a sound related to a video call in a plurality of output directions, Wherein the processor is configured to control the loudspeaker to output the sound in a direction close to a certain area among the plurality of output directions.

11. A method of controlling an electronic apparatus, comprising: acquiring an image captured by a camera while the camera is connected through an interface; obtaining information about a position where the camera is placed with respect to a display of the electronic apparatus among a plurality of positions where the camera is placeable with respect to a display; selecting a motion identification model, among a plurality of motion identification models, corresponding to the position where the camera is placed with respect to the display, the plurality of motion identification models being prepared in advance based on data of image taking angles of the camera at the plurality of positions with respect to the display and a function of the electronic apparatus while the camera is placed at the plurality of positions, respectively; identifying a motion of a user from the image captured by the camera based on the selected motion identification model; and performing the function based on the identified motion of the user.

12. The method of claim 11, wherein the obtaining information about the position where the camera is placed comprises: displaying a graphic user interface (GUI), which shows the plurality of positions where the camera is placeable, on the display; and receiving an input of the user selecting the position where the camera is placed, through the GUI.

13. The method of claim 11, further comprising displaying a notification for guiding the user to change the position of the camera on the display based on no motion identification model prepared corresponding to the position where the camera is placed among the plurality of motion identification models.

14. The method of claim 11, wherein the image captured by the camera comprises a first image, and the selecting the motion identification model comprises: selecting a motion identification model prepared based on a second image captured at a position within a predetermined range of the position of the camera among the plurality of motion identification models, acquiring a third image by correcting the first image to correspond to the second image, and identifying the motion of the user from the third image based on the selected motion identification model.

15. The method of claim 11, wherein the image captured by the camera comprises a first image, and the selecting the motion identification model comprises: selecting a motion identification model prepared based on a second image captured at an image capturing angle within a predetermined range of an image capturing angle of the camera among the plurality of motion identification models, acquiring a third image by correcting the first image to correspond to the second image, and identifying the motion of the user from the third image based on the selected motion identification model.

* * * * *